US 7,325,864 B1

(12) United States Patent
Echeverria

(10) Patent No.: US 7,325,864 B1
(45) Date of Patent: Feb. 5, 2008

(54) ROTATING AUTOMOTIVE GRILLE ASSEMBLY

(76) Inventor: Valentin Echeverria, 10720 Allwood La., Dallas, TX (US) 75229

( * ) Notice: Subject to any disclaimer, the term of this patent is extended or adjusted under 35 U.S.C. 154(b) by 0 days.

(21) Appl. No.: 11/510,957

(22) Filed: Aug. 28, 2006

(51) Int. Cl.
*B60K 11/08* (2006.01)
*B60R 19/52* (2006.01)

(52) U.S. Cl. .................................. 296/193.1; 180/68.6
(58) Field of Classification Search ............ 296/193.1; 180/68.1, 68.2, 68.6; 89/36.03; 160/DIG. 1; 40/591, 470–472, 524–528, 592, 593; 293/20
See application file for complete search history.

(56) References Cited

U.S. PATENT DOCUMENTS

| | | | | |
|---|---|---|---|---|
| 1,320,001 A | * | 10/1919 | Hans | 293/20 |
| 1,393,917 A | * | 10/1921 | Snell | 165/98 |
| 3,543,838 A | * | 12/1970 | White | 62/160 |
| 3,792,889 A | * | 2/1974 | Fuener et al. | 293/115 |
| 4,325,283 A | * | 4/1982 | Bemiss | 89/36.07 |
| 4,457,558 A | * | 7/1984 | Ishikawa | 296/180.5 |
| 5,780,761 A | * | 7/1998 | Musante et al. | 89/36.08 |
| 6,003,331 A | * | 12/1999 | Kohler et al. | 62/476 |
| 6,174,398 B1 | * | 1/2001 | Dieterich et al. | 156/228 |
| 6,421,117 B1 | * | 7/2002 | Akikuni | 356/73.1 |
| 6,439,328 B1 | * | 8/2002 | Vaillancourt et al. | 180/68.1 |
| 6,536,851 B2 | * | 3/2003 | Grob et al. | 305/115 |
| 6,561,937 B1 | * | 5/2003 | Wegele | 474/263 |
| 6,695,395 B2 | * | 2/2004 | Kallio | 296/202 |
| 6,805,213 B2 | * | 10/2004 | Seffernick et al. | 180/68.6 |
| 6,854,544 B2 | * | 2/2005 | Vide | 180/68.6 |
| 6,921,117 B2 | * | 7/2005 | Rackham et al. | 293/115 |
| 7,100,973 B2 | * | 9/2006 | Aigner et al. | 296/193.1 |
| 2004/0178664 A1 | * | 9/2004 | Hyuga | 296/193.1 |

OTHER PUBLICATIONS

The History of Electric Vehicles—The Early Years (1890-1930), from About.com, http://inventions.about.com/library/weekly/aacarselectrica.htm.*
The History of Electric Vehicles—The Middle Years (1930-1990), from About.com,http://inventors.about.com/library/weekly/aacarselectric1a.htm.*

* cited by examiner

*Primary Examiner*—Dennis H. Pedder
*Assistant Examiner*—Greg Blankenship

(57) ABSTRACT

A rotating automotive grille assembly that produces a distinctive and unique appearance for the front end of a motor vehicle where a plurality of elongated bars rotates either by airflow or by a motor.

7 Claims, 2 Drawing Sheets

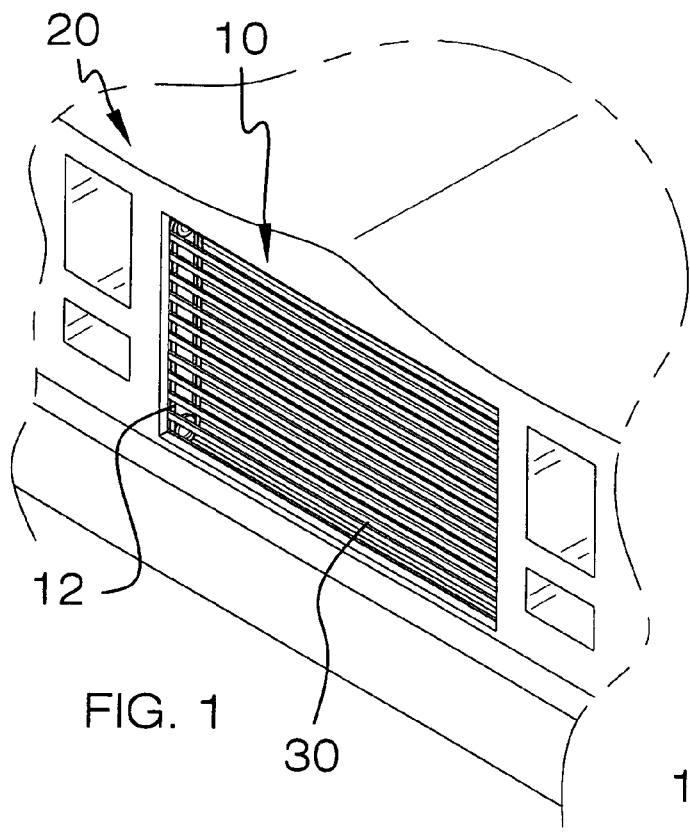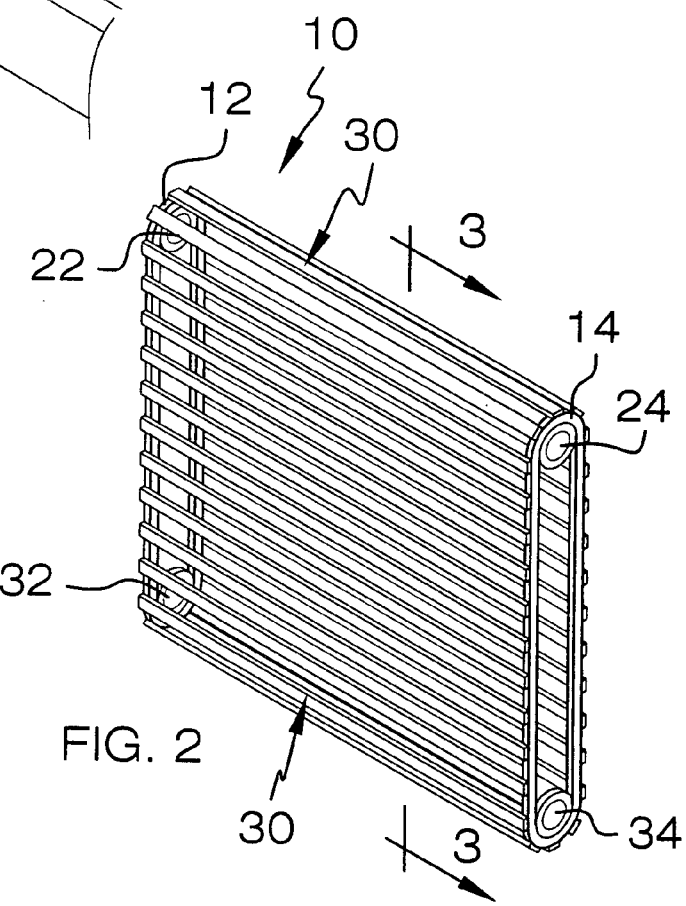

ROTATING AUTOMOTIVE GRILLE ASSEMBLY

FIELD OF THE INVENTION

The present invention generally relates to an automotive grille assembly and more particularly, relates to a decorative automotive grille assembly that rotates by a motor or by airflow.

BACKGROUND OF THE INVENTION

Radiator grille structure has been used on motor vehicles since the invention of an automobile. The radiator grille structure serves the dual purposes of not only providing a decorative effect to a front end of a motor vehicle, but also to protect the radiator assembly situated behind the grille structure from flying debris while the vehicle is operated on the road yet allowing air to flow through the grille structure to cool the radiator. The design of a radiator grille structure has been a major part of a front end design for a motor vehicle to make it distinctive and attractive while given an identity to the vehicle manufacturer. Certain foreign and domestic vehicle manufactures have specific radiator grille designs that is readily recognizable by anyone who is familiar with the automotive industry. Examples of such distinctive designs are found on foreign made vehicles such as Rolls Royce, Mercedes and BMW, or on domestic vehicle manufacturer such as Pontiac.

While distinctive designs are available for radiator grille structure on motor vehicles, such designs are exclusively stationary that are fixed on the motor vehicle's front end. It would be desirable to provide a different design such as a moving grille system to inpart distinctness and uniqueness of a motor vehicle.

It is therefore an object of the present invention to provide a motor vehicle grille assembly that does not have the drawbacks or shortcomings of the conventional grille assemblies.

It is another object of the present invention to provide an automotive grille assembly that is distinct from all conventional designs.

It is another further object of the present invention to provide an automotive grille assembly that is not stationary.

It is still another object of the present invention to provide an automotive grille assembly that rotates when the motor vehicle is moving.

SUMMARY OF THE INVENTION

In accordance with the present invention, a rotating automotive grille assembly can be constructed by a pair of spaced-apart, closed-loop pliable belt each engaged by and rotates on two spaced-apart rollers; a multiplicity of elongated bars each having two opposing ends each attached to one of the pair of spaced-apart, closed-loop pliable belt; and mounting means for fastening the grille assembly to a vehicle body.

BRIEF DESCRIPTIONS OF THE DRAWINGS

The invention will now be described, by way of example, with reference to the accompanying drawings, in which:

FIG. 1 is a perspective view of the front end of an automobile with the present invention rotating automotive grille assembly installed thereon.

FIG. 2 is a perspective view of the present invention rotating automotive grille assembly.

DETAILED DESCRIPTION OF THE PREFERRED EMBODIMENT

Figure 3:
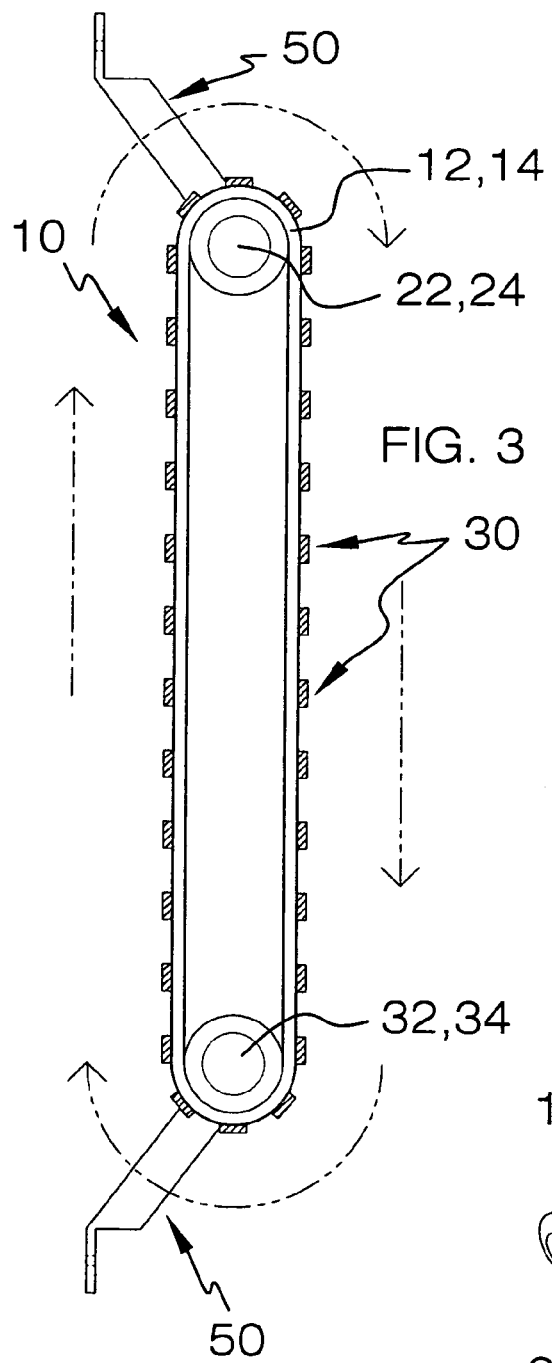
FIG. 3 is a cross-sectional view of the present invention rotating automotive grille assembly.

The present invention discloses a rotating automotive grille assembly that is distinctive and unique which rotates when the motor vehicle is being driven.

The present invention rotating automotive grille assembly is an automotive appearance upgrade that replaces static chrome or plastic vehicle grille centers with a decorative and functional grille including a plurality of closely spaced chrome or painted rollers that would have grooves or louvers to capture airflow and in part rotation under the forward motion of the vehicle. The present invention rotating automotive grille assembly can also function by having the rollers driven by an electric motor, especially at low vehicle speeds where airflow would be insufficient to impart a high-speed roller/impeller action.

The rotating automotive grille assembly may further utilize a clutch mechanism that permits free rotation at higher vehicle speeds such that adequate engine cooling can be maintained at all times. The grille assembly can therefore be used as a supplemental radiator or an engine cooling accessory that is functional in terms of performance as well as having an appealing decorative appearance.

The present invention rotating automotive grille assembly fulfills the need for a decorative grille appearance enhancement that can be easily installed by a customizing shop or automotive do-it-yourself enthusiasts, while offering the appearance of a highly customized sport/cruising vehicle. The appealing features of the present invention grille assembly is a rotating front grille, driven by the wind, a motor, or both. The grille assembly can be made in a simple bolt-on installation means for various makes and models of cars, trucks, and SUVs.

Referring initially to FIG. 1, wherein a present invention rotating automotive grille assembly 10 is shown installed on the front end of a motor vehicle 20. A more detailed view of the rotating grille assembly 10 is shown in a perspective view in FIG. 2. The rotating grille assembly 10 is constructed by a pair of spaced-apart, closed-loop pliable belts 12, 14 each is engaged by and rotates on two spaced-apart rollers, i.e. belt 12 rotates on rollers 22, 32 while belt 14 rotates on rollers 24 and 34. The rotating grille assembly 10 further includes a multiplicity of elongated bars 30 each having two opposing ends 36,38 which are attached to one of the pair of spaced-apart, closed-loop pliable belts 12 and 14. The attachment can be made with mechanical attachment means such as snaps or rivets (not shown). The pliable belts 12,14 can best be made in reinforced elastomer material, such as one that contains fibers or fabric.

The present invention rotating grille assembly may further include mounting means 50 for fastening the grille assembly 10 to a vehicle body 20. It should be noted that the mounting device 50 is only shown in FIG. 3 for simplicity reasons. The multiplicity of elongated bars 30 can be suitably made of plastic or metal.

Figure 4:
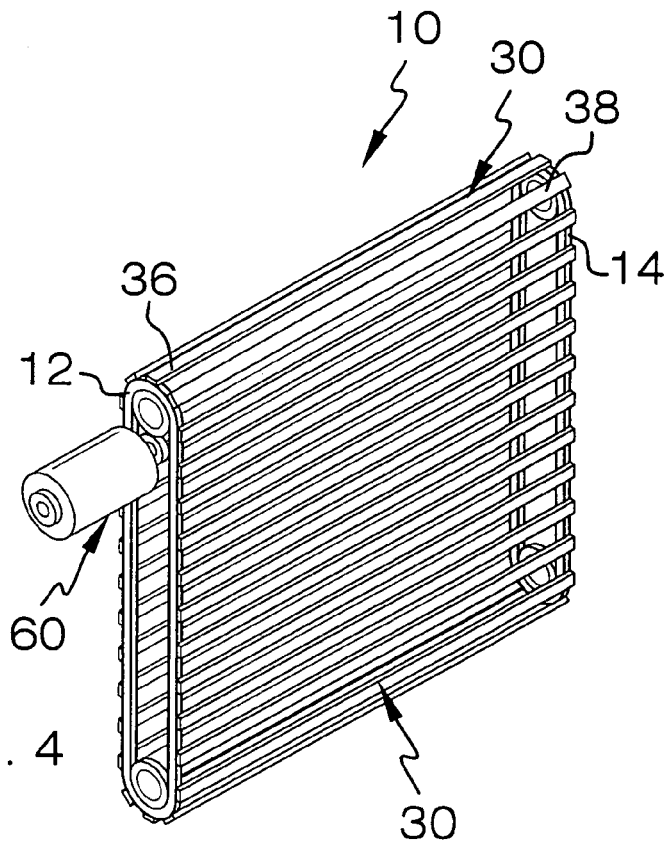
FIG. 4 is a perspective view of the present invention rotating automotive grille assembly complete with a motor.

The present invention multiplicity of elongated bars 30 may be driven by airflow when the vehicle is in motion, or may be driven by an optionally mounted motor 60, as shown in FIG. 4, or driven by both. The elongated bars 30 may be aerodynamically designed such that it is slightly curved in one direction to move more effectively when airflows therethrough.

The present invention rotating automotive grille assembly has therefore been amply described in the above descriptions and in the appended drawings of FIGS. 1-4.

While the preferred embodiments of the invention have been described above, it will be recognized and understood that various modifications can be made in the invention and the appended claims are intended to cover all such modifications which may fall within the spirit and scope of the invention.

What is claimed is:

1. A rotating automotive grille assembly comprising:
    a pair of spaced-apart rollers;
    an electric motor directly engages and rotates at least one of said pair of spaced-apart rollers;
    a pair of spaced-apart closed-loop pliable belts, each engaged by and rotates on said two spaced-apart rollers;
    a multiplicity of elongated bars each having two opposing ends attached to one of said pair of spaced-apart, closed-loop pliable belts; and
    mounting means for fastening the grille assembly to vehicle body.

2. The rotating automotive grille assembly according to claim 1, wherein said pliable belts are fabricated of an elastomeric material.

3. The rotating automotive grille assembly according to claim 1, wherein said pliable belts are fabricated of a fabric reinforced rubber.

4. The rotating automotive grille assembly according to claim 1, wherein said pliable belts are fabricated of a fiber reinforced polymeric material.

5. The rotating automotive grille assembly according to claim 1, wherein said multiplicity of elongated bars is attached to said pair of pliable belts by mechanical means.

6. The rotating automotive grille assembly according to claim 1, wherein said multiplicity of elongated bars is attached to said pair of pliable belts by adhesive means.

7. The rotating automotive grille assembly according to claim 1, wherein said multiplicity of elongated bars is fabricated in plastic or metal.

* * * * *